United States Patent [19]

Olper

[11] Patent Number: 5,750,019
[45] Date of Patent: May 12, 1998

[54] PROCESS FOR HYDROMETALLURGIC AND ELECTROCHEMICAL TREATMENT OF SULFUR ANTIMONY ORES WITH PRODUCTION OF ELECTROLYTIC ANTIMONY AND ELEMENTAL SULFUR

[75] Inventor: Marco Olper, Monza, Italy

[73] Assignee: Engitec S.p.A., Milan, Italy

[21] Appl. No.: 851,022

[22] Filed: May 5, 1997

[30] Foreign Application Priority Data

May 6, 1996 [IT] Italy .................. MI96A0890

[51] Int. Cl.$^6$ ...................................... C25C 1/22
[52] U.S. Cl. ............................................ 205/563
[58] Field of Search ............................... 205/563

[56] References Cited

U.S. PATENT DOCUMENTS

| | | |
|---|---|---|
| 793,039 | 6/1905 | Betts .................. 205/563 |
| 3,657,081 | 4/1972 | Holmes .............. 204/105 R |
| 3,883,345 | 5/1975 | Caldon et al. ............. 75/1 |
| 3,986,943 | 10/1976 | Lamb .................. 205/563 |
| 5,290,338 | 3/1994 | Anderson et al. ........ 75/703 |

FOREIGN PATENT DOCUMENTS

| | | |
|---|---|---|
| 2 474 529 | 7/1981 | France . |
| 360429 | 11/1921 | Germany . |
| 25 847 | 11/1910 | United Kingdom . |
| 9968 | of 1911 | United Kingdom . |
| 2 004 302 | 3/1979 | United Kingdom . |

OTHER PUBLICATIONS

Database WPI, Section Ch, Week 8605, Derwent Publications Ltd., London, GB; Class E32, AN 86–034139 XP002037185 & SU 167 225 A (Gidrotsvetmet), 15 Jul. 1985.

*Primary Examiner*—Kathryn L. Gorgos
*Assistant Examiner*—Edna Wong
*Attorney, Agent, or Firm*—IP Group of Pillsbury Madison & Sutro LLP

[57] ABSTRACT

A hydrometallurgic and electrochemical process for processing sulfur antimony ores and residues is disclosed, the end products from which are electrolytic antimony and elemental sulfur. The concentrate of sulfur antimony ore, leached with a solution of caustic alkali according to the known techniques dissolves, as sulfur salts as much Sb as possible, whilst the other heavy and precious metals which accompany the antimony bearing ore remain unchanged in the residue. From the solution of antimony sulfur salts pure $Sb_2S_3$ is precipitated by acidification and this sulfide, separated from the solution by filtration, is leached with a ferric fluoborate based electrolyte which oxidizes sulfide into elemental sulfur and dissolves antimony as $Sb^{3+}$ fluoborate. The resulting mixture is filtered once more in order to separate elemental sulfur and the solution of Sb fluoborate is submitted to electrolysis in a diaphragm cell with electrolytic Sb being obtained at the cathodes, and regenerated ferric fluoborate being recycled to the step of $Sb_2S_3$ leaching in the anodic compartment.

5 Claims, 1 Drawing Sheet

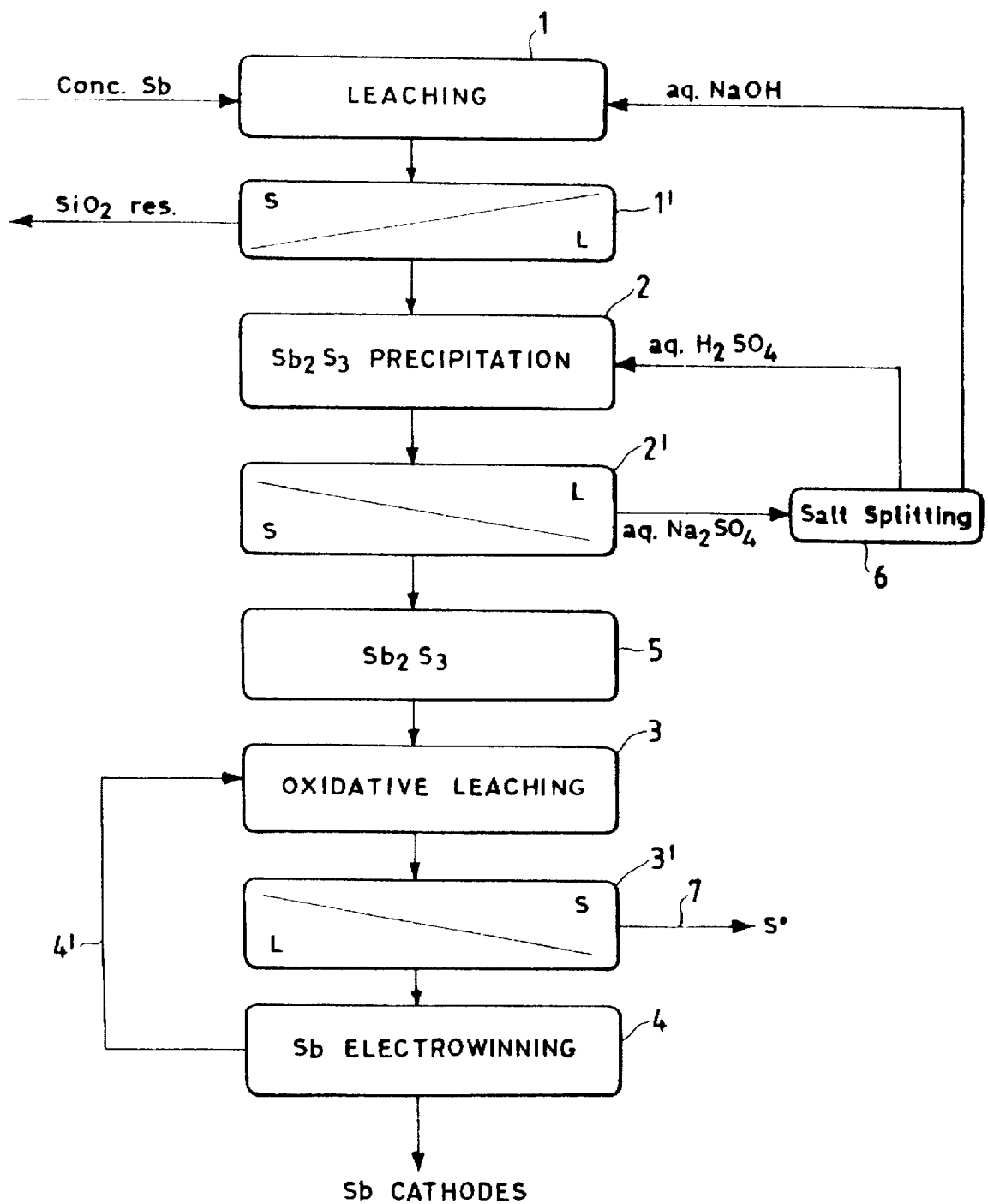

PROCESS FOR HYDROMETALLURGIC AND ELECTROCHEMICAL TREATMENT OF SULFUR ANTIMONY ORES WITH PRODUCTION OF ELECTROLYTIC ANTIMONY AND ELEMENTAL SULFUR

Antimonite, $Sb_2S_3$ is the main ore from which Sb is won. However, also tetrahedrite $Cu_8Sb_2S_7$, liwingstonite, $HgSb_4S_7$, jamesonite, $Pb_2Sb_2S_5$, are, or have been, materials object of industrial processing.

The electrolytic winning of Sb from its ores presupposes a leaching process and using the suitable reactant. On the other hand, the selection of the electrolyte for extracting Sb is very limited.

Hydrochloric acid and ferric chloride are extremely active leachants, but they yield solutions from which by electrolysis a deposit of amorphous Sb is obtained which is explosive, and unacceptable from the metallurgic viewpoint.

The solutions containing hydrofluoric acid suffer heavy losses of HF owing to the presence of silica in the gangue.

The solutions of mixed sulfuric and hydrofluoric acids found a limited use for refining impure Sb anodes.

The solutions of fluoboric type, as those used for electrowinning Pb from galena and for electrorefining copper scrap polluted by Pb and Sn, cannot be used owing to their poor selectivity, because they dissolve all heavy metals which accompany the antimony containing compounds.

The hydrometallurgic treatment of Sb is usually based on the strong solubility of antimony sulfide in an alkaline solution as $Na_2S$ or NaOH, in which most heavy metals, as Pb, Zn, Cu, Ag, and so forth, are insoluble. From the alkaline leaching of the concentrate, thanks to the high level of selectivity of the chemical attack, an antimony containing solution is produced which is pure enough to allow the direct recovery of Sb by electrolysis of the same solution. The cathodic deposit display a fairly good purity, but problems derive from the presence in the system of $S^{2-}$ ions, very reactive, both at the anode and at the cathode. The early patents and the first implementations of industrial facilities based on this electrolysis of sulfur salts date back to the years preceding the world war 1939–1945. Subsequently, and during the past 50 years, all metallurgic research concentrated on this type of electrolysis, with without diaphragm, with results being obtained which must be regarded as rather good from the technical and financial viewpoint, but with the problems having always to be coped with which are peculiar of the electrolysis of sulfur salts, i.e., the preservation of the delicate equilibriums of the electrolyte (in which $S^{2-}$ and ions derived from it $S_x^{2-}$, $S_2O_3^{2-}$, $SO_3^{2-}$, $SO_4^{2-}$, and so forth, accumulate), and the high energy consumption associated with the low conductivity of the solutions, with the discharge of $Sb^{+5}$ ion at the cathode, with the parasitic reactions at the anode and cathode, with the low current efficiencies.

A purpose of the present invention is of solving the various problems shown by the electrolytic process which uses the basic solutions which complex the sulfides, and in particular of drastically reducing the power consumption; causing sulfur to leave the system as a pure, marketable product, and consequently eliminating the treatment of the solutions containing sulfur bearing compounds (thiosulfates) and disposing off the relevant products; supplying a process which makes it possible the used solutions to be completely recycled.

In order to achieve such purposes, the present is invention proposes a process of treatment of a sulfur antimony ore with electrolytic antimony and elemental sulfur being produced, characterized in that it comprises the following steps:

a) leaching said sulfur antimony ore with a basic solution, with a solution of sulfur salts $NaSbS_2$ and NaSbSO being obtained, b) acidifying said solution of sulfur salts with insoluble $Sb_2S_3$ precipitating, which is separated, c) treating said $Sb_2S_3$ by means of ferric fluoborate according to the reaction

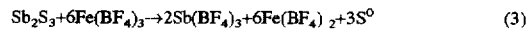  (3)

and separating the so obtained elemental sulfur, d) treating the solution obtained from said (c) step in an electrowinning cell, inside whose cathodic compartment the reaction

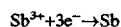

takes place with pure antimony being thus recovered at the cathode.

According to the present invention, the sulfur antimony ore, possibly concentrated by floating, is submitted to an initial leaching with a basic solution capable of extracting, in maximal yield, Sb contained in it according to the reactions:
conc.

  (1)

The solution of sulfur salts so obtained, in order to avoid the problems of direct electrolysis, is submitted to an acidification with $H_2SO_4$ in order to cause the separation of $Sb_2S_3$ according to the reaction

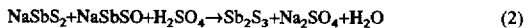  (2)

Sb sulfide, filtered off from the solution, is dissolved in the electrolyte of ferric fluoborate leaving the anodic compartment of the electrowinning cell. Elemental $S°$ is formed which is filtered off and can be marketed as such.

  (3)

By electrolyzing the filtered solution after sulfide leaching in a diaphragm cell, pure Sb is obtained at the cathode, and at the anode the dissolved ferrous fluoborate is oxidated again into ferric fluoborate.

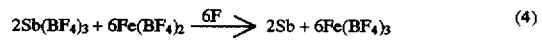  (4)

Uniting the whole process into one single reaction, the total process reaction is obtained as follows:
conc.

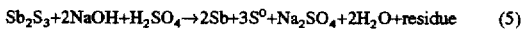  (5)

In order to better understand the characteristics and advantages, the process of the invention as defined above is disclosed in greater detail in the following by referring to the process flow sheet shown in the figure of the accompanying drawing. In said flow sheet, to each block a number is assigned which is the reference number assigned to the respective reactions (1) to (5) as defined above.

1. Leaching of antimony bearing compounds

According to the flow sheet displayed in the accompanying drawing, the concentrate leaching (1) is carried out in the block (1'), in which said concentrate is reacted with a solution of NaOH during a short time, with stirring, at the temperature of 100° C.

The extraction yields are of the order of 95–97%.

Only a small portion of As, usually present in antimonite and in the other complex antimony bearing compounds, are dissolved (15–18%): the fraction bound to iron as arsenopyrite is difficultly soluble.

Copper, iron, lead, zinc and any further precious metals possibly present remain with the silicaceous gangue and can be recovered by pyrometallurgic way. The filtration (1) is fast and washing effective, so the washed residue is well suitable for the operations for recovery of precious metals.

2. Precipitation of pure $Sb_2S_3$

The acidification (2) of the filtrate from (1') is carried out in (2) and can be carried out, for example, with $H_2SO_4$, HCl, $CO_2$, etc., with the precipitation of pure $Sb_2S_3$ and a sodium containing solution having as sodium counter anion the anion of the used acid, being obtained.

This step performs the double function of producing an Sb compound which is pure enough to be brought again into solution and directly electrolyzed, and of facilitating the dissolution of $Sb_2S_3$ in ferric fluoborate. In fact, a higher reactivity with acid is observed for freshly precipitated $Sb_2S_3$ than cristalline $Sb_2S_3$ present in antimony bearing ores.

If for the precipitation sulfuric acid is used, a solution of $Na_2SO_4$ is obtained. It can be regenerated in a salt splitting cell (6), when the environmental conditions allow it to be disposed of. It is well known that in a suitable diaphragm electrolysis cell from the solution of sodium sulfate a solution of NaOH and a solution of $H_2SO_4$ can be obtained at the cathodic compartment and at the anodic compartment, respectively, which display such concentration values and characteristics as to be suitable for being used again, the first one in the step (1) (concentrate leaching), the second one in the step (2) ($Sb_2S_3$ precipitation).

3. Leaching of $Sb_2S_3$ with ferric fluoborate

The electrolyte (4') exiting the anodic compartment of the Sb electrowinning cell (4) contains $Fe^{3+}$ ions in necessary amount to rapidly and completely dissolve the sulfide (5) precipitated in the reaction (2) and filtered off in (2').

These reactions explain two very important facts which characterize the process economy of the invention: the first 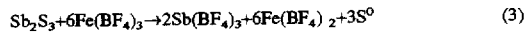 is that current efficiencies are much higher than of the process of electrolysis of sulfur salts, in which the cathodic reaction takes place by starting from $Sb^{+5}$, and owing to the effect of redissolution of the deposit by oxidized sulfur species, as polysulfide formed in the cell.

In the process of the invention, this does not happen, because to the cathode always $Sb^{3+}$ is supplied and the cathodic compartment is separated from the anodic compartment by the diaphragm.

The anodes of the cell are of graphite, the cathodes are of stainless steel, or copper.

The electrolyte operates at room temperature. The cathodic current density can vary from 50 up to 200 $A/m^2$ and is equal to the anodic current density.

The cell voltage is stable and is comprised within the range of from 1.5 to 2.5 V, according to the selected value for current density.

The current efficiencies are of >95%.

Power consumptions for electrowinning are of the order of magnitude of 1,200–1,800 Kwh/t of Sb, to be compared to the value of 5,000–6,000 Kwh/t of Sb of the known processes of alkaline solutions electrolysis.

Antimony is deposited from the fluoborate bath in smooth and compact microcrystalline form. The removal of the product is carried out on each $7^{th}$ day: the metal is separated from the cathodes by striking it with a wooden hammer, thanks to the brittleness of the deposit which comes off as large fragments.

An example is now reported which is not limitative of the invention.

EXAMPLE

An antimony concentrate having the following composition is treated according to the process according to the present invention:

| Sb % | Fe % | As ppm | Zn ppm | Pb ppm | Cu ppm | Hg ppm | Ca ppm | Cd ppm | $SiO_2$ % | S % |
|---|---|---|---|---|---|---|---|---|---|---|
| 65.8 | 1.69 | 8590 | 342 | 566 | 309 | 407 | <50 | <0.5 | 9.29 | 23 |

In the same leaching operation (3), elemental sulfur is simultaneously produced.

The reaction

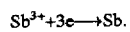

$$Sb_2S_3 + 6Fe(BF_4)_3 \rightarrow 2Sb(BF_4)_3 + 6Fe(BF_4)_2 + 3S^0 \quad (3)$$

takes place at room temperature with a high reaction rate and the conversion is total. Elemental sulfur (7) can be easily filtered off (3') and leaves the process as one of marketable products.

4. Electrowinning of Sb in the diaphragm cell

The rich antimony bearing solution, filtered, is fed to the cathodic compartment of the electrowinning cell (4) (in short form "E.W.") in which the following reaction takes place, as schematically shown:

$$Sb^{3+} + 3e^- \rightarrow Sb.$$

At the anode, the reaction:

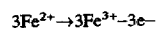

$$3Fe^{2+} \rightarrow 3Fe^{3+} - 3e^-$$

takes place.

a) Leaching with caustic alkali 150 g of concentrate is reacted for a few minutes at 100° C., with good stirring, in 1 l of 1N NaOH. The liquid phase is removed and the residue is washed on the filter with 200 ml of a hot solution of 0.5N NaOH (at its boiling temperature). An analysis of the solution (1,200 ml) by titration shows that it contains 78 g of Sb/l and 1.66 g of As/l. The extraction yields for Sb, also confirmed by its level in the residue are of 95%. The still low ratio of Sb to As is one among the reasons which suggest that $Sb_2S_3$ should be precipitated again for the purpose of purifying it.

b) The Sb containing caustic solution is fed to a tank with a twice as large capacity together with a solution of 480 g of $H_2SO_4$/l. The additions are carried out very carefully so as to keep the pH value always around 4. The brown precipitate formed is allowed to settle, in order to obtain a clear supernatant; the precipitate is filtered off through a vacuum filter. The filtration takes place steadily. From the weight of dry residue and its composition, one can observe that the yield of precipitation of $Sb_2S_3$ is practically quantitative and additionally also the ratio of Sb to As is considerably increased: titration tests allowed levels of 66.38% of Sb and 0.078 of As to be recorded; such high values for this ratio will allow an electrowinning to be performed after the dissolution by means of the fluoborate solution with good results in terms of cathodic purity.

c) Leaching of precipitated $Sb_2S_3$ with ferric fluoborate solution.

The precipitated and washed sulfide is redissolved with a solution of ferrous-ferric fluoborate containing 24 g of $Fe^{3+}$/l, so as to obtain a solution containing approximately 20 g of $Sb(BF_4)_3$/l: after 1 hour and a half of stirring at a temperature of about 30° C., the dissolution is completed and elemental sulfur is liberated. Sulfur obtained, in the amount of approximately 32 g, is filtered off and the solution is titrated; it contains 18.7 g of Sb/l and 39 mg of As/l. $Fe^{3+}$ level is decreased down to 9.4 g/l. Sulfur leaching yield resulted to be of round 97%.

d) Electrowinning from fluoborate solution

The antimony bearing fluoborate solution from above (c) step is fed to the cathodic compartment of a diaphragm cell. To the anodic compartment the same solution leaving the cathodic compartment of the preceding electrowinning test is fed. The anode is a graphite plate, the cathode is a plate of AISI 304 Cathodic current density: 100 A/m² Anodic current density: 190 A/m² During the test, the temperature was kept constant at 30° C. and the cell voltage value was of 2.25–2.30 V. The current efficiency as calculated from $Sb^{3+}$ deposition was of 95.9%. The energy consumption for electrowinning was of 1.67 Kwh/kg of Sb.

From the illustrated example one can infer that the process according to the present invention represents a substantial improvement over the prior art.

The introduction of $Sb_2S_3$ reprecipitation from the classic solution of sulfur salts is decidedly innovative, because it allows sulfide to be purified and makes it possible, thanks to the leaching of the latter with ferric fluoborate an electrowinning to be carried out which, as compared to the classic process, secures:

the drastic reduction in energy consumptions thanks to the higher current efficiencies and lower cell voltages;

the absence of secondary anodic and cathodic reactions associated with the rapid decay of the electrolyte and redissolution of metal already deposited on the cathode.

The purifications of solutions polluted by polysulfides and thiosulfates are no longer necessary, and purification residues to be disposed of are no longer generated.

I claim:

1. Process of treatment of a sulfur antimony ore wherein electrolytic antimony and elemental sulfur are produced, comprising the following steps:

a) leaching said sulfur antimony ore with an alkaline solution, wherein a solution of sulfur salts $NaSbS_2$ and NaSbSO is obtained, b) acidifying said solution of sulfur salts with insoluble $Sb_2S_3$ precipitating, which is separated, c) treating said $Sb_2S_3$ by means of ferric fluoborate according to the reaction $$Sb_2S_3+6Fe(BF_4)_3 \rightarrow 2Sb(BF_4)_3+6Fe(BF_4)_2+3S^0 \qquad (3)$$
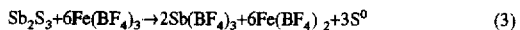

and separating the so obtained elemental sulfur, d) treating the solution obtained from said (c) step in an electrowinning cell inside whose cathodic compartment the reaction $$Sb^{3+}+3e^- \rightarrow Sb$$
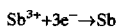

takes place, wherein pure antimony is thus recovered at a cathode.

2. Process according to claim 1, wherein said steps comprise the following reactions:

a) conc. $Sb_2S_3 + 2NaOH \longrightarrow NaSbS_2 + NaSbSO + H_2O +$ residue  (1)

b) $NaSbS_2 + NaSbSO + H_2SO_4 \longrightarrow Sb_2S_3 + Na_2SO_4 + H_2O$  (2)

c) $Sb_2S_3 + 6Fe(BF_4)_3 \longrightarrow 2Sb(BF_4)_3 + 6Fe(BF_4)_2 + 3S^0$  (3)

d) $2Sb(BF_4)_3 + 6Fe(BF_4)_2 \xrightarrow{6F} 2Sb + 6Fe(BF_4)_3$  (4)

3. Process according to claim 2, wherein said ferric fluoborate $Fe(BF_4)_3$ formed in said reaction (4) is recycled to said step (c) in order to perform said $Sb_2S_3$ leaching reaction (3).

4. Process according to claim 2, wherein said sodium sulfate $Na_2SO_4$ formed in said step (b) is fed to a salt splitting cell in order to regenerate $H_2SO_4$ and NaOH, which are recycled to said steps (b) and (a), respectively.

5. Process according to claim 1, wherein said electrowinning cell is a diaphragm cell.

* * * * *